US007066811B1

(12) United States Patent
DeFrees-Parrott et al.

(10) Patent No.: US 7,066,811 B1
(45) Date of Patent: Jun. 27, 2006

(54) GAMING MACHINE WITH ACTIVE PAY-TABLE AND METHOD THEREFOR

(76) Inventors: Troy DeFrees-Parrott, 2117 Redbird Dr., Las Vegas, NV (US) 89134; John P. Meekins, 1925 Winding Oaks Way, Naples, FL (US) 34109

( * ) Notice: Subject to any disclaimer, the term of this patent is extended or adjusted under 35 U.S.C. 154(b) by 70 days.

(21) Appl. No.: 10/091,822

(22) Filed: Mar. 6, 2002

Related U.S. Application Data

(60) Provisional application No. 60/273,872, filed on Mar. 7, 2001.

(51) Int. Cl.
*A63F 13/00* (2006.01)

(52) U.S. Cl. ............................ 463/19; 463/16; 463/20; 463/22; 273/139

(58) Field of Classification Search ............. 273/138.1, 273/139, 143 R, 292; 463/16–22, 30, 40, 463/43, 12–13
See application file for complete search history.

(56) References Cited

U.S. PATENT DOCUMENTS

| | | | | |
|---|---|---|---|---|
| 4,198,052 | A | 4/1980 | Gauselmann | 273/143 |
| 4,448,419 | A | 5/1984 | Telnaes | 463/21 |
| 4,695,053 | A | 9/1987 | Vazquez, Jr. et al. | 463/18 |
| 4,874,173 | A | 10/1989 | Kishishita | 273/143 R |
| 5,085,436 | A | 2/1992 | Bennett | 463/21 |
| 5,102,134 | A | 4/1992 | Smyth | 463/21 |
| 5,102,137 | A | 4/1992 | Ekiert | 273/143 R |
| 5,209,479 | A | 5/1993 | Nagao et al. | 463/21 |
| 5,342,047 | A | 8/1994 | Heidel et al. | 463/29 |
| 5,393,061 | A | 2/1995 | Manship et al. | 463/20 |
| 5,569,084 | A | 10/1996 | Nicastro et al. | 463/20 |
| 5,580,053 | A | 12/1996 | Crouch | 463/20 |
| 5,584,764 | A | 12/1996 | Inoue | 463/20 |

(Continued)

FOREIGN PATENT DOCUMENTS

EP 558307 A2 * 9/1993

OTHER PUBLICATIONS

Robert N. Geddes, Slot Machines on Parade, The Mead Company, First Edition□□1937 Mills Bonus "Horse Hear" 5 pages.*

*Primary Examiner*—Xuan M. Thai
*Assistant Examiner*—Alex F. R. P. Rada, II
(74) *Attorney, Agent, or Firm*—Raymond Nuzzo

(57) ABSTRACT

In one aspect, the present invention is directed to a method of operating a gaming machine, comprising providing a gaming machine having a game display for displaying symbols resulting from play of the gaming machine, and a pay-table display for displaying an active pay-table. The active pay-table has symbols that match the symbols displayed in the game display. The pay-table display is configured such that each symbol of the active pay-table has an inactivated state wherein the symbol of the active pay-table is subdued in appearance and an activated state wherein that symbol of the active pay-table is clearly visible. The pay-table display is configured to activate symbols on the active pay-table in response to the symbols appearing in the game display. The method further comprises the step of playing the gaming machine so that symbols appear in the game display, activating symbols on the active pay-table that match the symbols appearing in the game display, providing a pay-out to a player when a predetermined symbols appear in the game display, and providing a pay-out to the player when a predetermined symbols on the active pay-table are activated.

10 Claims, 4 Drawing Sheets

U.S. PATENT DOCUMENTS

| | | | | |
|---|---|---|---|---|
| 5,609,524 | A | 3/1997 | Inoue | 463/20 |
| 5,611,535 | A | 3/1997 | Tiberio | 273/143 R |
| 5,647,798 | A * | 7/1997 | Falciglia | 463/19 |
| 5,697,843 | A | 12/1997 | Manship et al. | 463/20 |
| 5,704,835 | A | 1/1998 | Dietz, II | 463/20 |
| 5,766,074 | A | 6/1998 | Cannon et al. | 463/16 |
| 5,807,172 | A | 9/1998 | Piechowiak | 463/20 |
| 5,848,932 | A | 12/1998 | Adams | 463/20 |
| 5,882,261 | A | 3/1999 | Adams | 463/20 |
| 5,984,781 | A | 11/1999 | Sunaga | 463/20 |
| 6,004,207 | A | 12/1999 | Wilson, Jr. et al. | 463/20 |
| 6,056,642 | A | 5/2000 | Bennett | 463/20 |
| 6,089,978 | A | 7/2000 | Adams | 463/20 |
| 6,093,102 | A | 7/2000 | Bennett | 463/20 |
| 6,120,378 | A | 9/2000 | Moody et al. | 463/20 |
| 6,159,096 | A | 12/2000 | Yoseloff | 463/20 |
| 6,203,430 | B1 * | 3/2001 | Walker et al. | 463/20 |
| 6,227,969 | B1 * | 5/2001 | Yoseloff | 463/13 |
| 6,364,766 | B1 * | 4/2002 | Anderson et al. | 463/16 |
| 6,364,767 | B1 * | 4/2002 | Brossard et al. | 463/20 |
| 6,364,768 | B1 * | 4/2002 | Acres et al. | 463/25 |
| 6,413,162 | B1 | 7/2002 | Baerlocher et al. | 463/20 |
| 6,468,156 | B1 * | 10/2002 | Hughs-Baird et al. | 463/25 |
| 6,612,575 | B1 * | 9/2003 | Cole et al. | 273/138.1 |
| 6,685,563 | B1 * | 2/2004 | Meekins et al. | 463/25 |
| 6,695,696 | B1 * | 2/2004 | Kaminkow | 463/16 |
| 2002/0086725 | A1 * | 7/2002 | Fasbender et al. | 463/11 |

* cited by examiner

SYMBOLS APPEARING IN THE GAME DISPLAY SYMBOLS ON THE ACTIVE PAY-TABLE DISPLAY

GAMING MACHINE WITH ACTIVE PAY-TABLE AND METHOD THEREFOR

CROSS-REFERENCE TO RELATED APPLICATIONS

This application claims the benefit of the filing date of commonly owned and copending U.S. provisional patent application Ser. No. 60/273,872, filed Mar. 7, 2001.

BACKGROUND OF THE INVENTION

1. Field of the Invention

The present invention generally relates to gaming machines or devices.

2. Description of the Related Art

In a standard gaming machine, e.g. video slot machine or reel slot machine, the player starts the game and the reels in the game display spin and then stop to display whether or not the player has won a prize. If the reels stop and one or more symbols appear on the pay-line then the player will win a predefined prize amount. The predefined prize amount is displayed on the game pay-table. The game pay-table shows that certain matching symbols are worth more than others and certain symbols may pay with one symbol showing whereas other symbols may only pay with 2, 3, 4 or all symbols appearing on the pay-line. Variations to the standard gaming machine exist that allow players to win prizes if certain symbols appear in the game display even if they do not land on a designated pay-line. However, in all such games the majority of the prizes are awarded for symbols that land on one or more pay-lines.

SUMMARY OF THE INVENTION

In one aspect, the present invention is directed to a method of operating a gaming machine, comprising providing a gaming machine having a game display for displaying symbols resulting from play of the gaming machine, and a pay-table display for displaying an active pay-table. The active pay-table has symbols that match the symbols displayed in the game display. The pay-table display is configured such that each symbol of the active pay-table has an inactivated state wherein the symbol of the active pay-table is subdued in appearance and an activated state wherein that symbol of the active pay-table is clearly visible. The pay-table display is configured to activate symbols on the active pay-table in response to the symbols appearing in the game display. The method further comprises the step of playing the gaming machine so that symbols appear in the game display, activating symbols on the active pay-table that match the symbols appearing in the game display, providing a pay-out to a player when a predetermined symbols appear in the game display, and providing a pay-out to the player when a predetermined symbols on the active pay-table are activated.

The method includes the step of initializing the pay-table display prior to play of the gaming machine so as to inactivate all symbols of the active pay-table that were previously in the activated state.

In one embodiment, the playing step comprises inputting a wager into the gaming machine.

In one embodiment, the gaming machine comprises a slot machine having a predetermined number of reels visible in the game display wherein each reel has a predetermined number of symbols thereon, and the step of playing the gaming machine comprising spinning the reels. In one embodiment, the slot machine has at least one pay-line on the game display and the results of each play of the gaming machine are based upon the combination of symbols that arrive at the pay-line. In such an embodiment, the activating step comprises activating symbols on the active pay-table that match the symbols arriving at the pay-line.

In one embodiment, the at least one pay-line comprises a plurality of pay-lines, and the activating step comprises activating symbols on the active pay-table that match the symbols arriving at all of the pay-lines.

In another aspect, the present invention is directed to a gaming machine, comprising a device for randomly providing symbols for each play of the gaming machine, a game display for displaying the provided symbols resulting from play of the gaming machine, a device for providing a pay-out to a player when predetermined symbols appear in the game display, and a pay-table display for displaying an active pay-table. The active pay-table has symbols that match the symbols displayed in the game display. The pay-table display is configured such that each symbol of the active pay-table has an inactivated state wherein the symbol is subdued in appearance and an activated state wherein the symbol is clearly visible. The gaming machine further comprises a device for activating symbols on the active pay-table in response to the symbols appearing in the game display, a device for providing a pay-out to a player when predetermined symbols appear in the game display, and a device for providing a pay-out to the player when predetermined symbols on the active pay-table are activated.

In one embodiment, the gaming machine includes a device for initializing the pay-table display prior to play of the gaming machine so as to inactivate all symbols of the active pay-table that were previously in the activated state.

The gaming machine further includes a device for enabling a player to input a wager into the gaming machine.

In one embodiment, the gaming machine comprises a slot machine having a predetermined number of reels visible in the game display wherein each reel has a predetermined number of symbols thereon, the gaming machine further comprising means for spinning the reels. In one embodiment, the slot machine has at least one pay-line on the game display and the results of each play of the gaming machine are based upon the combination of symbols that arrive at the pay-line. In such an embodiment, the activating device is configured to activate symbols on the active pay-table that match the symbols arriving at the pay-line.

In another embodiment, the at least one pay-line comprises a plurality of pay-lines, and the activating device is configured to activate symbols on the active pay-table that match the symbols arriving at all of the pay-lines.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which.

DESCRIPTION OF THE PREFERRED EMBODIMENTS

The present invention is directed to a gaming machine (e.g. slot machine) that generally comprises a game display that displays symbols resulting from play of the gaming machine and a display for displaying an active-pay-table. The gaming machine of the present invention allows a player to build or form his or her own pay-table and win prizes as certain symbols are displayed anywhere in the game display. The pay-table that the player actually builds is referred to herein as an active pay-table.

The gaming machine of the present invention can be configured with or without pay-lines on the game display. Thus, prizes can be awarded without the need for pay-lines.

The ensuing description is in terms of the gaming machine of the present invention being configured as a reel-type slot machine or a video reel slot machine. Such slot machines are described in U.S. Pat. Nos. 5,934,672, 5,984,782, 6,003,867 and 6,004,207, the disclosures of which are incorporated herein by reference. However, it is to be understood that the gaming machine of the present invention can be configured as almost any other type of gaming machine.

Figure 1:
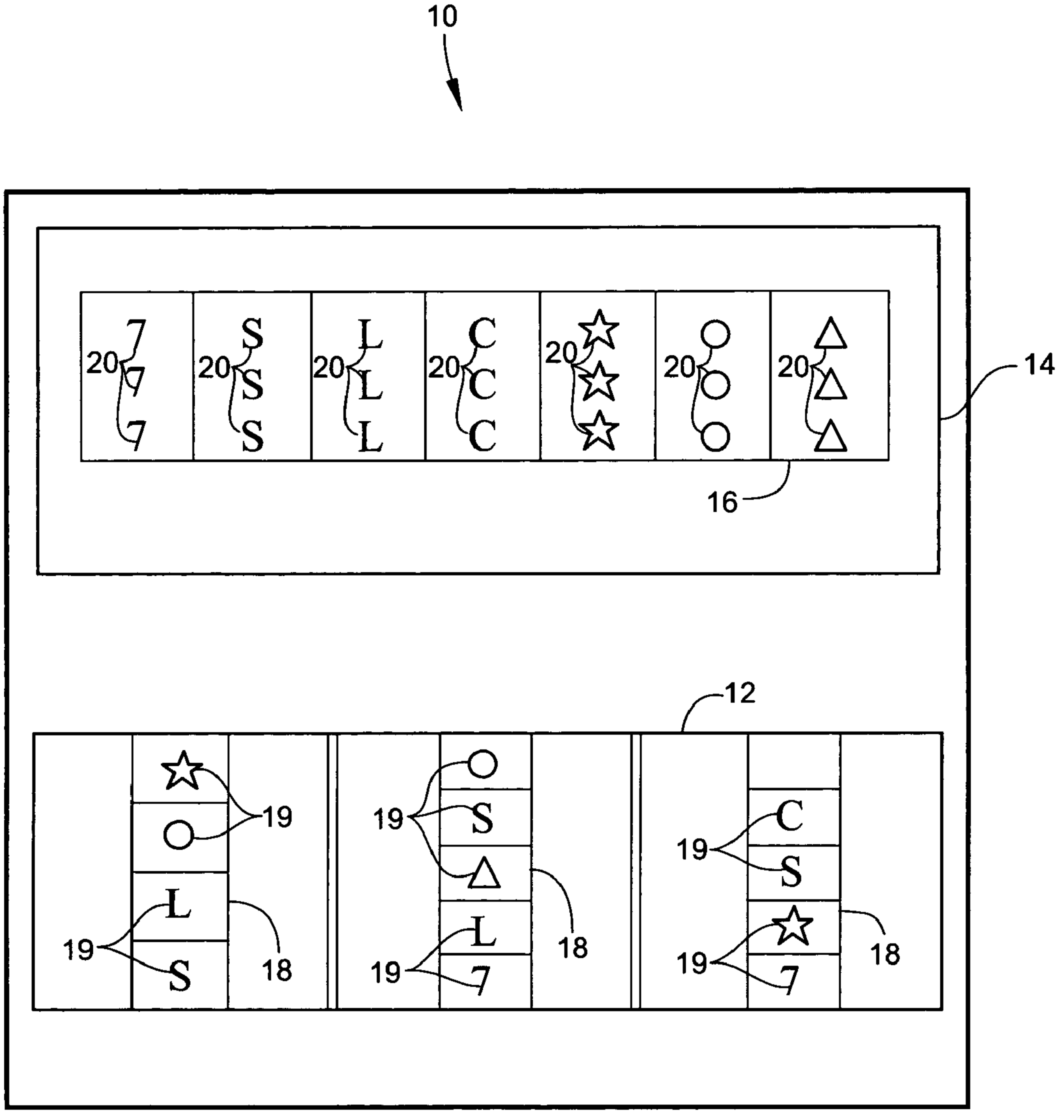
FIG. 1 is a block diagram of the gaming machine of the present invention.

Referring to FIG. 1, there is shown gaming machine 10 of the present invention. For purposes of brevity and to facilitate understanding of the invention, the other components of the slot machine, well known in the art, are not shown. Gaming machine 10 generally includes game display 12 and display 14 that displays the active pay-table 16. Gaming machine 10 includes reels 18 that are displayed in game display 12. Each reel 18 has a plurality of symbols 19 thereon as is known in the art. In one embodiment, reels 18 are mechanical reels well known in the art. In another embodiment, reels 18 are generated electronically as is accomplished in electronic video slot machines. Although three (3) reels 18 are shown in FIG. 1, it is to be understood that more than or less than three (3) reels 18 can be used.

In a preferred embodiment, active pay-table 16 comprises a plurality of symbols 20 that match the symbols on reels 18. In accordance with the invention, each of the symbols 20 on active pay-table 16 has an inactive first state, in which the symbols are subdued in appearance, and an active second state, in which the symbols 20 are activated and clearly visible. When the symbols 20 are in the inactive state (or inactivated), the symbols 20 are subdued in appearance and visibility of the subdued symbols 20 is significantly diminished or the symbols 20 do not appear at all. In one embodiment, when the symbols 20 are in the inactive state, each of the symbols 20 is in the form of a silhouette. In another embodiment, when the symbols 20 are in the inactive state, each of the symbols 20 is in the form of a shadow. In a further embodiment, when the symbols 20 are in the inactive state, each of the symbols 20 is represented by an outline of that particular symbol. In yet a further embodiment, when the symbols 20 are in the inactive state, each of the symbols 20 is not represented visually until activated at which point the symbol will be displayed.

If lights or LEDs are used to illuminate active pay-table 18, symbols 20 are illuminated when activated, and not illuminated when these symbols are inactivated.

In one embodiment, prior to play on gaming machine 10, all symbols 20 are initially in the inactive state. The player starts the game by inserting a coin or playing a credit and activating the gaming machine 10 so as to cause the reels 18 to spin. When reels 18 stop spinning and particular symbols appear anywhere in game display 12 of gaming machine 10, display 14 activates symbols 20 that match the symbols appearing in display 12. Thus, if the "CHERRY", "LEMON" and "7" symbols appear in game display 12 of the gaming machine 10, these same symbols are activated on the active pay-table 16 so as to become clearly visible. Once symbols 20 on the active pay-table 16 are activated, they remain activated until a pay-out is made to the player or the player cashes out using a reset option that is part of the software programming of gaming machine 10, display 14 and active pay-table 16. If during play of gaming machine 10, the player receives a particular symbol in the game display 12 (e.g., CHERRY) on three different occasions, three CHERRY symbols on the active pay-table 16 are activated. Once the third CHERRY symbol becomes activated on the active pay-table 16, gaming machine 10 pays the appropriate pay-out associated with the three symbols (i.e. three CHERRIES). Thus, as the player continues playing the gaming machine 10 and reels 18 continue to spin, symbols 20 on active pay-table 18 are constantly being activated. Thus, a player could receive a pay-out for having three "7" symbols activated on active pay-table 16 even though three "7" symbols never once appeared simultaneously in the game display 12. This feature of gaming machine 10 significantly distinguishes gaming machine 10 from standard (or prior art) gaming machines wherein the player wins a pay-out for receiving three "7" symbols only by continuing to play the standard gaming machine until three "7" symbols simultaneously arrive on the pay-line in the game display.

Referring to FIG. 1, when a pay-out occurs as a result of three symbols being activated on the active pay-table 16, the symbols 20 upon which the pay-out is based are reset to the subdued or inactivated state. The activated symbols of active pay-table 16 that are not associated with that particular pay-out remain activated.

Figure 2:
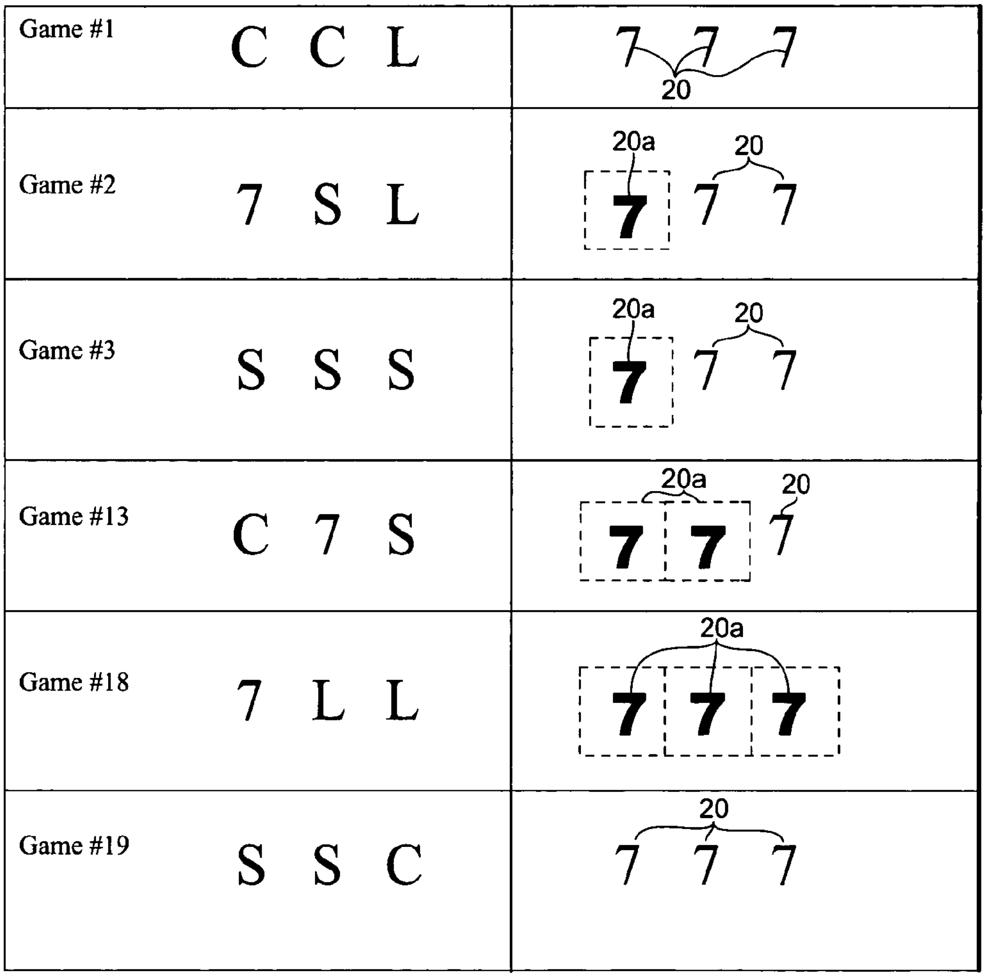
FIG. 2 is a table that illustrates the operation of a gaming display and an active pay-table of the gaming machine of FIG. 1.
Figure 3:
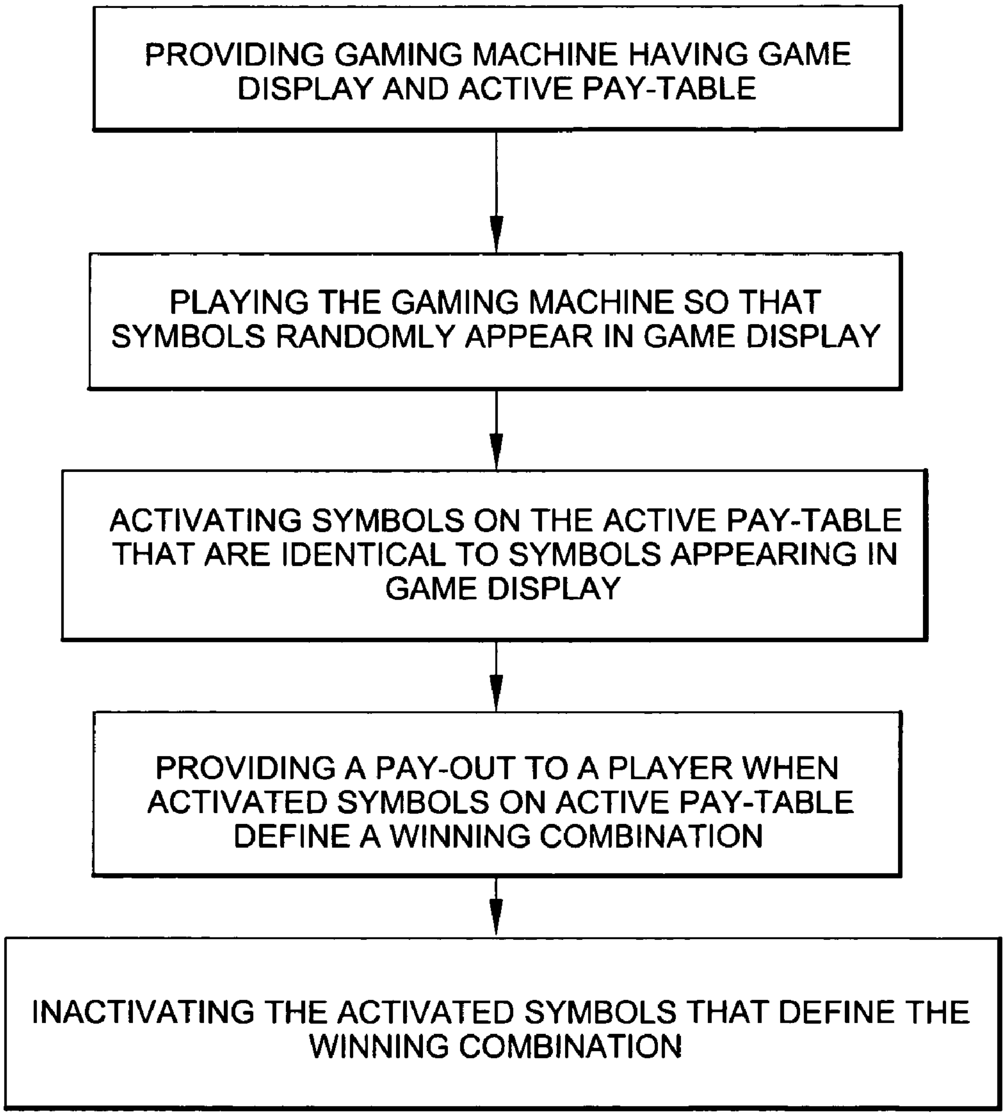
FIG. 3 is flow diagram of one embodiment of the method of the present invention.

The following example, in conjunction with FIGS. 1, 2 and 3, illustrate the operation of gaming machine 10. In FIGS. 1 and 2, the letters "C", "L", and "S" refer to the symbols "CHERRY", "LEMON" and "STRAWBERRY", respectively. For purposes of this example, it is assumed that gaming machine 10 pays twenty (20) coins when three "7" symbols appear in game display 12 and activated on active pay-table 16. Furthermore, for purposes of this example, the active pay-table 16 is configured to have three "7" symbols that are initially inactivated or subdued. (However, it is to be understood that the active pay-table can have other symbols as well). Whenever a "7" symbol appears in game display 12 of gaming machine 10, a "7" symbol is activated on the active pay-table 16. In order to facilitate understanding of the invention, the symbols that are activated are indicated by numeral 20*a* and bold type and are located within the boundary defined by dashed lines in FIG. 2. The term "Game #" refers to a particular "game". A "game" is the sequence of events wherein a player inserts a coin or plays a credit, the reels spin, and the player either wins nothing or wins a pay-out. Thus, each "spin" of the reels constitutes a game.

Prior to Game #1, all "7" symbols in the active pay-table 16 are initially inactivated or subdued in appearance. In Game #1, two CHERRYS and a LEMON appear in the game display. As a result, all "7" symbols in the active pay-table 16 remain inactivated or subdued.

In Game #2, a "7" symbol appears in game display 12. As a result, the first "7" symbol in the active pay-table 16 becomes activated (indicated by numeral 20*a* and bold type and dashed lines).

In Game # 3, none of the symbols appearing in the game display 12 is a "7" symbol. Therefore, the other two "7" symbols on the active pay-table 16 remain inactive or subdued in appearance.

In game #s 4–12 (not shown in FIG. 2), none of the symbols appearing in the game display 12 is a "7" symbol. Therefore, the other two "7" symbols on the active pay-table 16 remain inactive or subdued in appearance.

In Game #13, the CHERRY, "7" and STRAWBERRY symbols appear in the game display 12. As a result, another "7" symbol on active pay-table 16 becomes activated (indicated by numeral 20*a* and bold type and located within dashed lines).

In game #s 14–17, inclusive (not shown in FIG. 2), none of the symbols appearing in the game display 12 is a "7" symbol. Therefore, the last subdued or inactive "7" symbol remains subdued or inactive.

In Game #18, the "7", CHERRY and CHERRY symbols appear in the game display 12. Therefore, the last subdued or inactive "7" symbol is activated (indicated by numeral 20*a* and bold type and located within dashed lines) and gaming machine 10 pays the player twenty (20) coins even though three (3) "7" symbols did not once simultaneously appear in game display 12.

In an alternate embodiment, game display 12 of gaming machine 10 is configured to include at least one pay-line (not shown) in game display at which the symbols 19 on reels 18 must arrive in order for the corresponding matching symbol on the active pay-table 16 to become activated.

In an alternate embodiment, gaming machine 10 does not include reels 16 but instead, is configured to allow symbols to randomly appear and disappear and or scroll across the game display in a manner designed to represent a reel spin after which the symbols stop and any and all symbols shown in the game display which are represented on the active pay-table are activated.

In an alternate embodiment, a reset trigger is added to allow a player to cash-out and deactivate all the symbols 20 on the active pay-table 16 if the player desires to completely stop playing gaming machine 10.

In a further embodiment, active pay-table 16 is configured to activate symbols 20 that match particular symbols that appear only on a particular reel 18 (e.g. first reel, middle reel, fifth reel, etc.).

In an alternate embodiment of the present invention, the active pay-table display is used as a bonus pay-table. In such a configuration, a player wins standard prizes in accordance with the normal operation of the gaming machines. When particular or predetermined symbols appear on the pay line of the gaming machine or alternatively anywhere in the game display, these same symbols are also activated on the active pay-table display. When the required number of symbols on the active pay-table display are activated, the player wins a bonus prize.

Figure 4:
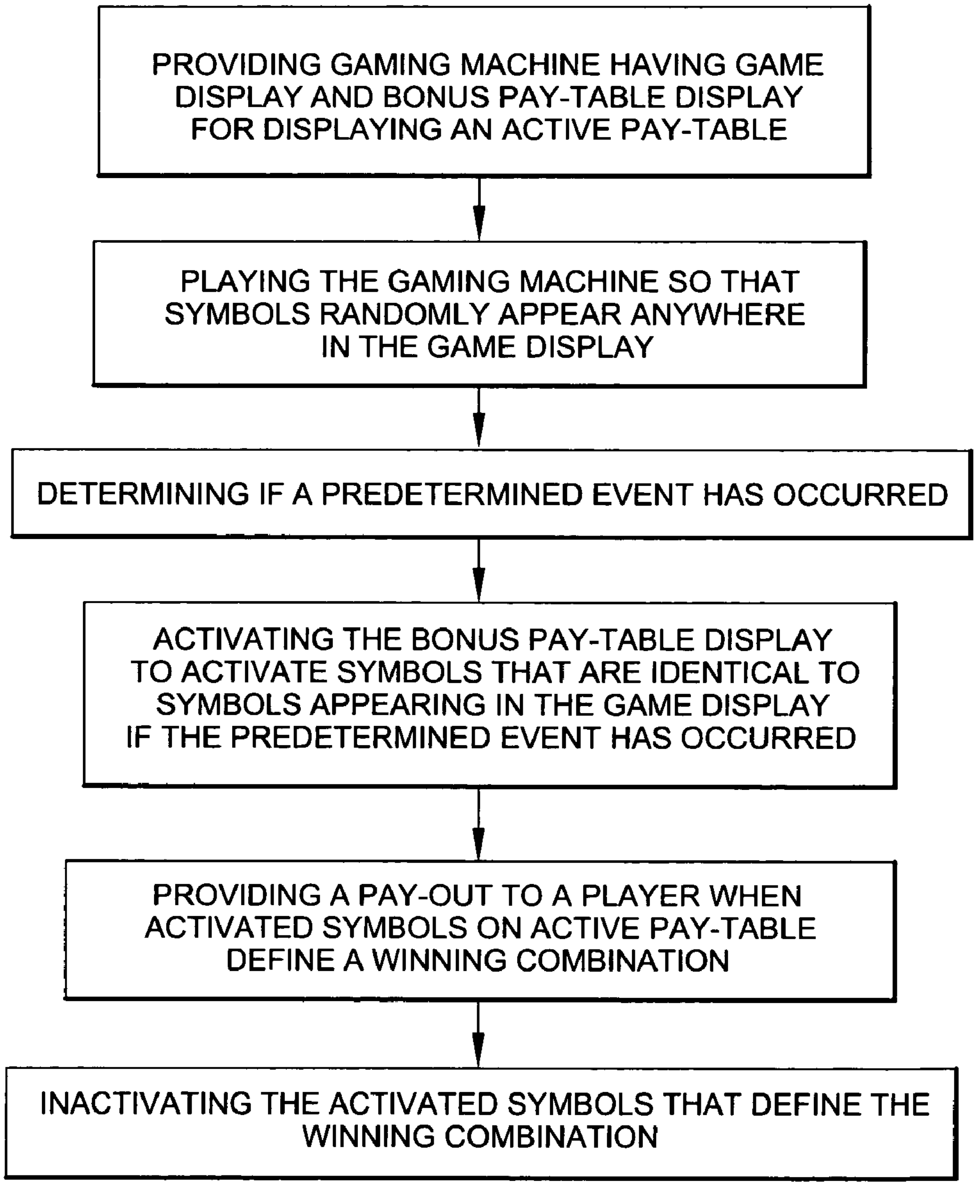
FIG. 4 is a flow diagram of another embodiment of the method of the present invention.

In another embodiment, the active pay-table display is part of a bonus game that is played only after the player has met predetermined criteria or event regarding his or her play of the gaming machine. A flow diagram of this embodiment is shown in FIG. 4. In one embodiment, the predetermined criteria is a predetermined cumulative amount of money (e.g. coins) that must be wagered by the player. In such a configuration, the bonus game and active pay-table are activated when the player's cumulative wagers equal to the predetermined cumulative amount. In another embodiment, the predetermined criteria is a predetermined cumulative amount of elapsed time in which the player must engage the gaming machine in normal play. In a further embodiment, the predetermined criteria is the random generation of a predetermined number. In such an embodiment, the gaming machine includes electronic circuitry to effect a random number generator. In yet a further embodiment, the predetermined criteria is a special bonus trigger symbol that lands on a payline in the game display or appears anywhere in the game display.

In a further embodiment, the active pay-table display is part of a bonus game that is played only after the player has met predetermined criteria regarding his or her play of the gaming machine. However, the player is eligible to win only a bonus prize and cannot win any prize associated with the normal play of the gaming machine.

If display 14 and active pay-table display 16 are used as a bonus game, the symbols 20 may remain activated until the bonus is paid. In an alternate embodiment, if display 14 and active pay-table display 16 are used as part of a bonus game and a player is entitled to a certain number of spins in the bonus game, the symbols 20 on the active pay-table 16 may remain activated until the predetermined number of spins have occurred. When the predetermined number of spins have occurred, all symbols 20 on the active pay-table display are inactivated and standard or normal play resumes.

In one embodiment, a display device, such as a liquid crystal display (LCD) device is used to display the active pay-table. In another embodiment, lights or LEDS (light-emitting-diodes) are used to display symbols on the active pay-table. In a preferred embodiment, the display device displaying the active pay-table is located in the cabinet of the gaming machine directly above, below or beside the game display of a standard gaming machine. In another embodiment, the active pay-table is integral with the existing game display of the gaming machine when the game display is a video screen. In an alternate embodiment, the hardware used to provide the active pay-table display is separate from and positioned adjacent to the gaming machine and is electronically connected to the electronic circuitry of the gaming machine. For example, the hardware containing the display device for displaying the active pay-table can be positioned on top of, below, or on the side of the gaming machine.

It will be appreciated that a standard (or prior art) gaming machine can be retrofitted to provide a secondary pay-table display that replaces the existing gaming display and is configured to operate in the same manner as gaming display 12 and active pay-table 16.

The apparatus and method of the present invention can be used with or integrated into many products, gaming machines and casino games, namely, Poker Games, Poker & Slot Machine Hybrids, Video Lottery terminals, Video Reel Slots and Physical Reel Slots w/display (video).

The principals, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations in changes may be made by those skilled in the art without departing from the spirit of the invention. Accordingly, the foregoing detailed description should be considered exemplary in nature and not limited to the scope and spirit of the invention as set forth in the attached claims.

What is claimed is:

1. A method of operating a gaming machine, comprising:

providing a gaming machine having a game display for randomly displaying symbols resulting from play of the gaming machine, and an active pay-table display fox displaying an active pay-table, the active pay-table having a plurality of predetermined symbols that are identical to particular symbols randomly displayed in the game display, the plurality of predetermined symbols comprising at least one group of like symbols, the active pay-table display being configured such that each symbol of the active pay-table has an inactivated state wherein the symbol of the active pay-table is subdued in appearance and an activated state wherein that symbol of the active pay-table is clearly visible, the active pay-table display being configured to activate symbols on the active pay-table in response to the particular symbols that randomly appear anywhere in the game display;

playing the gaming machine so that symbols randomly appear anywhere in the game display;

activating symbols on the active pay-table that are identical to particular symbols that randomly appear in the game display;

wherein the symbols are activated on the active pay-table irrespective of where on the game display the identical symbols appear;

wherein a symbol in the at least one group of like symbols is activated every time an identical symbol appears in the game display; and providing a pay-out to the player when activated symbols on the active pay-table define a winning combination.

2. The method according to claim 1 further including the step of, after the step of providing a payout, inactivating the activated symbols that define the winning combination.

3. The method according to claim 1 wherein the gaming machine comprises a slot machine having a predetermined number of reels visible in the game display, each reel having a plurality of symbols thereon, the step of playing the gaming machine comprising the step of spinning the reels.

4. The method according to claim 3 wherein the activating step activates a symbol on the active pay-table when an identical symbol on any reel appears in the game display after the reels stop spinning.

5. A method of operating a gaming machine, comprising:

providing a gaming machine having a game display for displaying symbols resulting from normal play of the gaming machine, and a bonus pay-table display for displaying an active pay-table, the active pay-table having a plurality of predetermined symbols that are identical to particular symbols displayed in the game display, the plurality of predetermined symbols comprising at least one group of like symbols, the bonus pay-table display being configured such that each symbol of the active pay-table has an inactivated state wherein the symbol of the active pay-table is subdued in appearance and an activated state wherein that symbol of the active pay-table is clearly visible, the bonus pay-table display being activated when a predetermined event occurs;

playing the gaming machine so that symbols randomly appear anywhere in the game display in accordance with normal play;

determining if a predetermined event has occurred;

activating the bonus pay-table display so as to activate symbols on the active pay-table that are identical to particular symbols randomly appearing anywhere in the game display it the predetermined event has occurred;

wherein the symbols are activated on the active pay-table irrespective of where on the game display the identical symbols appear;

wherein a symbol in the at least one group of like symbols is activated every time an identical symbol appears in the game display; and providing a pay-out to the player when activated symbols in the active pay-table define a winning combination.

6. A gaming machine, comprising:

a game display for randomly displaying symbols resulting from normal play of the gaming machine, the symbols appearing anywhere on the game display;

a bonus pay-table display for displaying an active pay-table, the active pay-table having a plurality of predetermined symbols that are identical to particular symbols displayed on the game display, the plurality of predetermined symbols comprising at least one group of like symbols, the bonus pay-table display being configured such that each symbol of the active pay-table has an inactivated state wherein the symbol of the active pay-table is subdued in appearance and an activated state wherein that symbol of the active pay-table is clearly visible, the bonus pay-table display being activated when a predetermined event occurs;

means for effecting play of the gaming machine so that symbols randomly appear anywhere in the game display in accordance with normal play;

means for determining if a predetermined event has occurred;

means for activating the bonus pay-table so as to activate symbols on the active pay-table that are identical to particular symbols randomly appearing anywhere in the game display if the predetermined event has occurred;

wherein the activating means activates symbols on the active pay-table irrespective of where on the game display the identical symbols appear and wherein the activating means activates a symbol in the at least one group of like symbols every time an identical symbol appears in the game display; and means for providing a pay-out to the player when activated symbols in the active pay-table define a winning combination.

7. A gaming machine comprising:

a gaming machine having a game display for randomly displaying symbols resulting from play of the gaming machine wherein the symbols can be displayed anywhere on the game display, and an active pay-table display for displaying an active pay-table, the active pay-table having a plurality of predetermined symbols that are identical to particular symbols randomly appearing in the game display, the plurality of predetermined symbols comprising at least one group of like symbols, the pay-table display being configured such that each symbol of the active pay-table has an inactivated state wherein the symbol of the active pay-table is subdued in appearance and an activated state wherein that symbol of the active pay-table is clearly visible, the pay-table display being configured to activate symbols on the active pay-table in response to particular symbols randomly appearing anywhere in the game display;

means for playing the gaming machine so that symbols randomly appear in the game display;

means for activating symbols on the active pay-table that are identical to particular symbols randomly appearing anywhere in the game display;

wherein the activating means activates symbols on the active Pay-table irrespective of where on the game display the identical symbols appear and wherein the activating means activates a symbol in the at least one group of like symbols every time an identical symbol appears in the game display; and means for providing a pay-out to the player when activated symbols on the active pay-table define a winning combination.

8. The gaming machine according to claim 7 further including means for inactivating the activated symbols that define the winning combination after the payout is provided to the player.

9. The gaming machine according to claim 7 wherein the gaming machine comprises a slot machine having a predetermined number of reels visible in the game display, each reel having a plurality of symbols thereon, the gaming machine further comprising means for spinning the reels.

10. The gaming machine according to claim 9 wherein the activating step activates a symbol on the active pay-table when an identical symbol appears in the game display after the reels stop spinning.

* * * * *